(12) United States Patent
Kim et al.

(10) Patent No.: US 8,753,784 B2
(45) Date of Patent: Jun. 17, 2014

(54) SEPARATOR FOR MOLTEN CARBONATE FUEL CELL

(75) Inventors: Young Jin Kim, Daejeon (KR); In Gab Chang, Daejeon (KR); Boo Ho Yoon, Daejeon (KR); Tae Won Lee, Daejeon (KR); Young Bong Kim, Daejeon (KR)

(73) Assignee: Doosan Heavy Industries & Construction Co., Ltd., Changwon-Si (KR)

( * ) Notice: Subject to any disclaimer, the term of this patent is extended or adjusted under 35 U.S.C. 154(b) by 1455 days.

(21) Appl. No.: 11/966,364

(22) Filed: Dec. 28, 2007

(65) Prior Publication Data

US 2008/0160365 A1 Jul. 3, 2008

(30) Foreign Application Priority Data

Dec. 29, 2006 (KR) .................. 10-2006-0138186

(51) Int. Cl.
| | |
|---|---|
| *H01M 8/04* | (2006.01) |
| *H01M 8/06* | (2006.01) |
| *H01M 2/38* | (2006.01) |
| *H01M 2/40* | (2006.01) |
| *H01M 8/24* | (2006.01) |

(52) U.S. Cl.
USPC ............ 429/514; 429/423; 429/457; 429/458

(58) Field of Classification Search
USPC .................................. 429/423, 457, 458, 514
See application file for complete search history.

(56) References Cited

U.S. PATENT DOCUMENTS

| | | | | |
|---|---|---|---|---|
| 5,077,148 | A | * 12/1991 | Schora et al. | ................ 429/425 |
| 6,200,696 | B1 | 3/2001 | Farooque et al. | |
| 6,372,374 | B1 | 4/2002 | Li et al. | |
| 6,383,677 | B1 | * 5/2002 | Allen | ........................... 429/454 |
| 2004/0071617 | A1 | 4/2004 | Blanchet et al. | |
| 2004/0137309 | A1 | 7/2004 | Allen et al. | |

FOREIGN PATENT DOCUMENTS

| | | |
|---|---|---|
| JP | 05-242899 | 9/1993 |
| JP | 10-154519 | 6/1998 |
| JP | 11-67242 | 3/1999 |

OTHER PUBLICATIONS

Altergy systems, Fuel Cell Basics, Sep. 2011: http://www.altergy.com/knowledge/default.asp.*

* cited by examiner

*Primary Examiner* — Eugenia Wang
(74) *Attorney, Agent, or Firm* — Sughrue Mion, PLLC

(57) ABSTRACT

Disclosed herein is a separator for a molten carbonate fuel cell, the separator including four steel sheets in which edges of the four steel sheets are joined to each other thereby providing three spaces therebetween, comprising a cathode channel, serving as a flow path of oxidant gas, formed in the first space; an anode channel, serving as a flow path of fuel gas, formed in the second space such that the anode channel is separated from the cathode channel; and a fuel gas reforming channel formed in the third space, which is located between the first space and the second space. The separator for a molten carbonate fuel cell is advantageous in that the volume of the fuel cell is decreased, and the structure thereof is simple, thus reducing the production cost thereof.

9 Claims, 5 Drawing Sheets

SEC` B-B

Reforming Gas in

SEC` E-E

Reformated Gas in

SEC` F-F

SEPARATOR FOR MOLTEN CARBONATE FUEL CELL

BACKGROUND OF THE INVENTION

1. Field of the Invention

The present invention relates to a separator for a molten carbonate fuel cell, and, more particularly, to a separator for a molten carbonate fuel cell, which can decrease the volume of the fuel cell compared to conventional fuel cells because the separator is provided therein with a fuel gas reforming channel, and which can reduce production costs because the separator has a simple structure.

2. Description of the Related Art

Generally, a fuel cell is a generator serving to convert chemical energy into electrical energy through the oxidation and reduction of reactants. Unlike other existing types of chemical energy, the fuel cell causes hardly any pollution or noise because it discharges only water ($H_2O$) as a by-product, and the chemical reaction in the fuel cell is simple. Therefore, the fuel cell is receiving great attention as an alternative energy source for the next generation.

In particular, among fuel cells, a molten carbonate fuel cell (MCFC) uses molten carbonates as an electrolyte and operates at about 650° C., and thus the electrochemical reaction rate in the MCFC is rapid. Therefore, the molten carbonate fuel cell does not need a precious metal catalyst, such as a platinum catalyst, and can exhibit high thermal efficiency of 60% or more when it is used together with electricity and high temperature, and thus it can be used for combined heat and power generation using the gasification of coal.

A unit cell of a molten carbonate fuel cell includes an anode and a cathode, in which an electrochemical reaction is conducted, a separator for forming a fuel gas channel and an oxidant gas channel, a charge collecting plate, an electrolyte plate fabricated in the form of a sheet to meet the convenience of stacking, and a matrix for storing molten carbonate. In the unit cell of the molten carbonate fuel cell, when fuel gas is supplied to an anode and oxidant gas is supplied to a cathode, an electrochemical reaction is conducted in each of the electrodes, thus obtaining direct current voltage.

Since the voltage obtained from the unit cell is about 0.7~1.2 V, which is low, at the time of rated electric discharge, in practice, a plurality of unit cells is layered, so that the total voltage of the fuel cell is increased and the total surface area of the unit cells is also increased, thereby obtaining high power. The structure in which a plurality of unit cells is layered is referred to as "a stack".

Since such a stack determines the power generation efficiency, lifespan and performance of the molten carbonate fuel cell, the shape of a separator constituting the stack and the method of supplying fuel into the separator are very important.

Meanwhile, in the molten carbonate fuel cell, since a water vapor reforming reaction for forming a reformed gas containing hydrogen using methane gas and water vapor, which is an endothermic reaction, is conducted together with an electrochemical reaction (anode: oxidation reaction, cathode: reduction reaction), which is an exothermic reaction, a fuel reforming apparatus is used to supply heat generated from the electrochemical reaction to the water vapor reforming reaction, which requires heat.

However, conventional molten carbonate fuel cells are problematic in that the above fuel reforming apparatus is separately provided outside the fuel cell and connected with a separator, and thus the volume thereof is increased and the structure thereof is complicated. Specifically, in conventional molten carbonate fuel cells, fuel gas is reformed from the fuel reforming apparatus provided outside the fuel cell, and then the reformed fuel gas is supplied into a stack through a separator connected with the fuel reforming apparatus. For this reason, the conventional molten carbonate fuel cells are problematic in that the volume thereof is increased, and in that the structure for connecting the fuel reforming apparatus with the separator is complicated, so that the installation thereof is not easy, thereby increasing production costs.

SUMMARY OF THE INVENTION

Accordingly, the present invention has been made keeping in mind the above problems occurring in the prior art, and an object of the present invention is to provide a separator for a molten carbonate fuel cell, the fuel cell including a fuel gas reforming channel provided between an anode channel and a cathode channel without separately providing a fuel gas reforming apparatus, by which the volume of the fuel cell is decreased, and the structure thereof is simple, thus reducing the production cost thereof.

In order to accomplish the above object, the present invention provides separator for a molten carbonate fuel cell, the separator including four steel sheets in which edges of the four steel sheets are joined to each other thereby providing three spaces therebetween, comprising a cathode channel, serving as a flow path of oxidant gas, formed in the first space; an anode channel, serving as a flow path of fuel gas, formed in the second space such that the anode channel is separated from the cathode channel; and a fuel gas reforming channel formed in the third space, which is located between the first space and the second space.

Here, the separator may be provided at the border thereof with an oxidant gas inlet manifold for introducing oxidant gas, an oxidant gas outlet manifold for discharging oxidant gas, an fuel gas inlet manifold for introducing fuel gas, a fuel gas outlet manifold for discharging fuel gas, and a reformed gas exchange manifold from which the fuel gas reforming channel and the anode channel diverge.

Further, it is preferred that reformed fuel gas, having passed through the fuel gas reforming channel, be turned back from the reformed gas exchange manifold and then introduced into the anode channel.

In this case, the fuel gas reforming channel may be supported with a catalyst layer for reforming fuel gas.

BRIEF DESCRIPTION OF THE DRAWINGS

The above and other objects, features and advantages of the present invention will be more clearly understood from the following detailed description taken in conjunction with the accompanying drawings, in which:

FIG. 1 to 9 show separators for a molten carbonate fuel cell according to the present invention, in which:

FIG. 1 is a schematic view showing the flow of oxidant gas;

FIG. 2 is a cross-sectional view of a cathode inlet manifold;

FIG. 3 is a cross-sectional view of a cathode outlet manifold;

FIG. 4 is a schematic view showing the flow of fuel gas;

FIG. 5 is a cross-sectional view of an anode inlet manifold;

FIG. 6 is a cross-sectional view of a reformed fuel gas exchange manifold;

FIG. 7 is a schematic view showing the flow of reformed fuel gas;

FIG. 8 is a cross-sectional view of a fuel gas outlet manifold; and

FIG. 9 is a cross-sectional view of a gas leakage prevention manifold.

DESCRIPTION OF THE PREFERRED EMBODIMENTS

Figure 1:
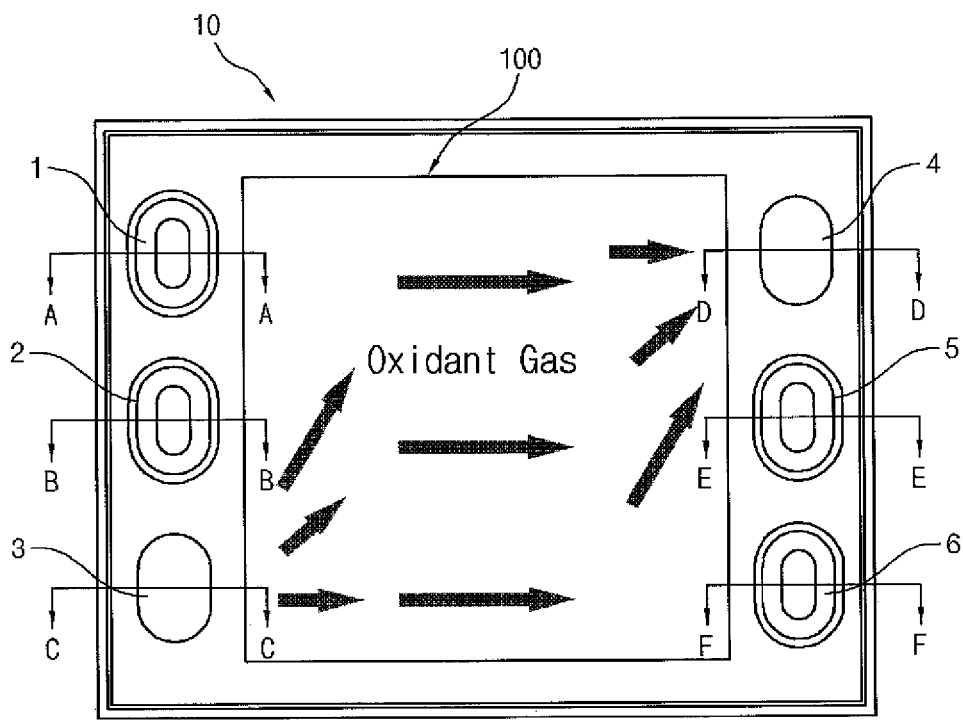

Hereinafter, a preferred embodiment of the present invention will be described in detail with reference to the attached drawings.

A better understanding of the present invention may be obtained through the following preferred embodiment which is set forth to illustrate, but is not to be construed as the limit of the present invention.

Reference now should be made to the drawings, in which the same reference numerals are used throughout the different drawings to designate the same or similar components.

Figure 2:
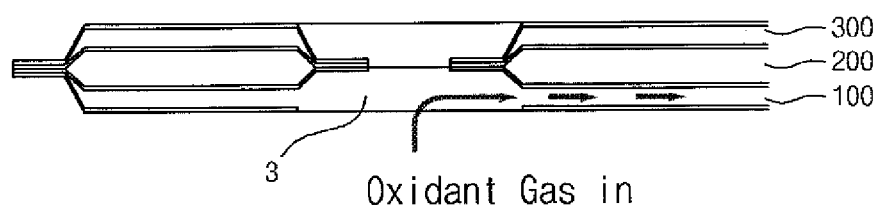
Figure 3:
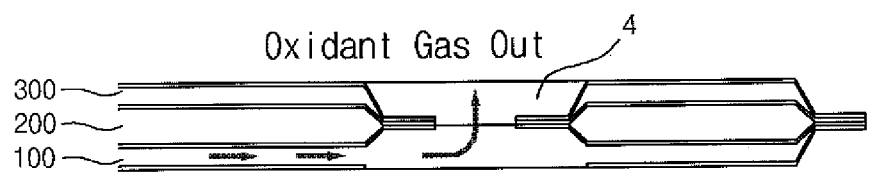
Figure 4:
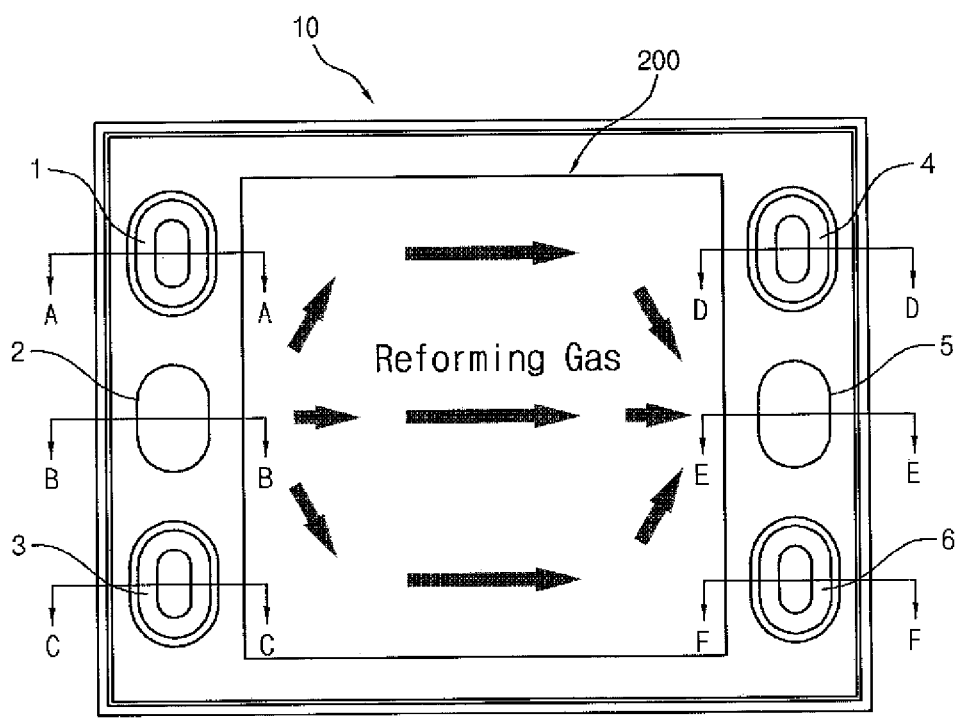
Figure 5:
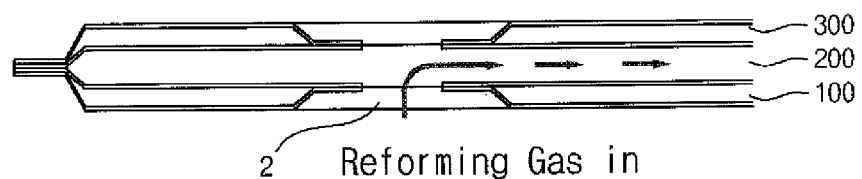
Figure 6:
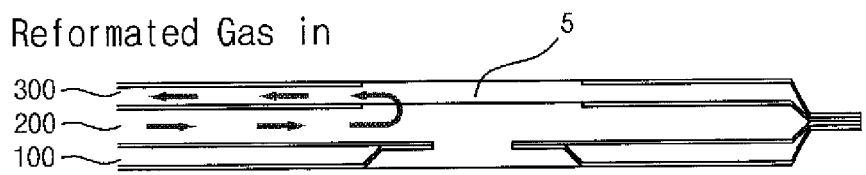
Figure 7:
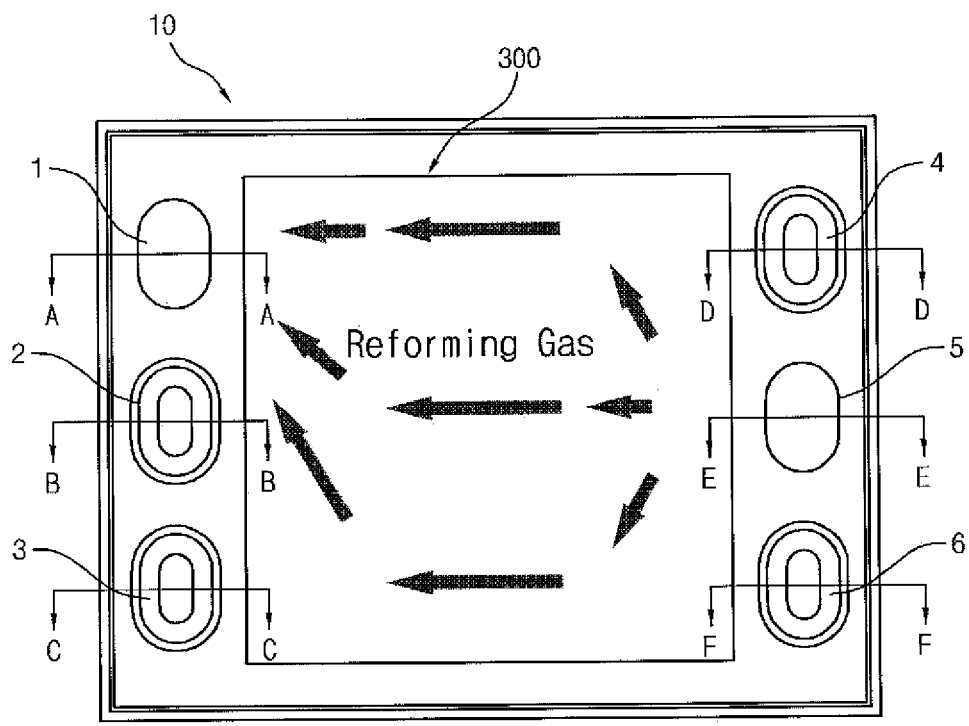
Figure 8:
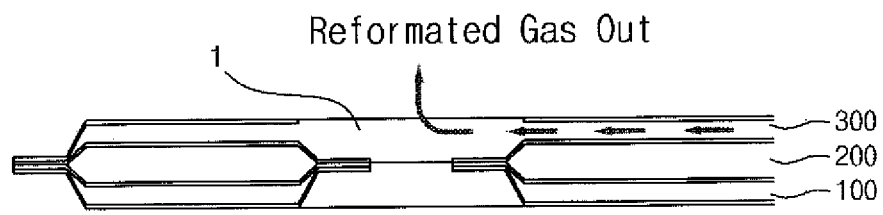
Figure 9:
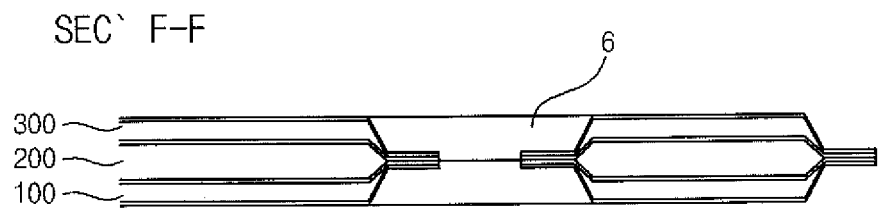

FIGS. 1 to 9 show a separator for a molten carbonate fuel cell according to the present invention, in which FIG. 1 is a schematic view showing the flow of oxidant gas, FIG. 2 is a cross-sectional view of a cathode inlet manifold, FIG. 3 is a cross-sectional view of a cathode outlet manifold, FIG. 4 is a schematic view showing the flow of fuel gas, FIG. 5 is a cross-sectional view of an anode inlet manifold, FIG. 6 is a cross-sectional view of a reformed fuel gas exchange manifold, FIG. 7 is a schematic view showing the flow of reformed fuel gas, FIG. 8 is a cross-sectional view of a fuel gas outlet manifold, and FIG. 9 is a cross-sectional view of a gas leakage prevention manifold.

The separator 10 provided in the molten carbonate fuel cell according to the present invention includes four steel sheets. The separator 10 is provided therein with three channels, and is provided at the border thereof with six manifolds. Specifically, the separator 10 includes four steel sheets, and three spaces are formed therein by joining the edges of the four steel sheets together. Gas flow channels, which are partially closed and partially open, are formed in the spaces located in the separator 10. This separator 10 is provided therein with a cathode channel 100, a fuel gas reforming channel 200 and an anode channel 300, and is provided at the border thereof with a fuel gas inlet manifold 2 for introducing fuel gas, a fuel gas outlet manifold 1 for discharging fuel gas, an oxidant gas inlet manifold 3 for introducing oxidant gas, an oxidant gas outlet manifold 4 for discharging oxidant gas, a reformed gas exchange manifold 5, and a gas leakage prevention manifold 6.

FIGS. 1 to 3 are a schematic view and cross-sectional views showing the flow of oxidant gas according to the present invention.

As shown in FIG. 1, oxidant gas, which is a mixed gas of carbon dioxide ($CO_2$) and air, is introduced into an oxidant gas inlet manifold 3, reduced with a cathode in a cathode channel 100, and then discharged through an oxidant gas outlet manifold 4.

Specifically, as shown in FIG. 2, in the oxidant gas inlet manifold 3 (section C-C), a fuel gas reforming channel 200 and an anode channel 300 are closed to prevent the introduced oxidant gas from being mixed with other gases, and thus the introduced oxidant gas flows only through a cathode channel 100 that is open. As shown in FIG. 3, the oxidant gas flowing through the cathode channel 100 is reduced with the cathode in the cathode channel 100, and is then discharged through the oxidant gas outlet manifold 4 (section D-D). In this case, the fuel gas reforming channel 200 and anode channel 300 are closed to prevent the inflow of the oxidant gas.

FIGS. 4 and 5 are a schematic view and a cross-sectional view showing the flow of fuel gas according to the present invention.

As shown in FIG. 4, fuel gas is introduced into a fuel gas reforming channel 200 through a fuel gas inlet manifold 2, and then moves to a reformed gas exchange manifold 5. Specifically, as shown in FIG. 5, in the fuel gas inlet manifold 2 (section B-B), a fuel gas reforming channel 200 and an anode channel 300 are closed to prevent the introduced fuel gas from being mixed with other gases, and thus the introduced fuel gas flows into the fuel gas reforming channel 200 that is open.

Here, it is preferred that the fuel gas be a mixed gas of methane gas and water vapor. This fuel gas is converted into a reformed gas containing hydrogen through a water vapor reforming reaction in the fuel gas reforming channel 200. The fuel gas reforming channel 200 is supported with nickel catalyst layers (hot shown). When the catalyst layers are appropriately distributed in the fuel gas reforming channel 200, the temperature of the molten carbonate fuel cell is uniformly controlled, and thus the temperature conditions of the stack of the fuel cell can be appropriately maintained Specifically, the fuel gas and oxidant gas are simultaneously oxidized and reduced at the anode and cathode, respectively, and thus the endothermic reaction and the exothermic reaction are also simultaneously conducted, with the result that the temperature of the stack is maintained uniform, thereby maintaining the fuel cell at an appropriate temperature.

As shown in FIG. 6, the above reformed gas flows through the fuel gas reforming channel 200, and then flow into an anode channel 300 in a reformed gas exchange manifold 5 (section E-E). Specifically, as shown in FIG. 6, in a reformed gas exchange manifold 5 (section E-E), a cathode channel 100 is closed to prevent the reformed gas, flowing through the fuel gas reforming channel 200, from being mixed with the oxidant gas. Therefore, the reformed gas, having flown through the fuel gas reforming channel 200, is turned back to an anode channel 100.

FIGS. 7 and 8 are a schematic view and a cross-sectional view showing the flow of reformed fuel gas according to the present invention. As shown in FIG. 7, reformed fuel gas having flown into an anode channel 300 is discharged to an anode through a fuel gas outlet manifold 1 along the anode channel 300. Specifically, as shown in FIG. 8, in the fuel gas outlet manifold 1 (section A-A), a fuel gas reforming channel 200 and a cathode channel 100 are closed to prevent the introduced reformed fuel gas from being mixed with other gases. The introduced reformed fuel gas flows through the anode channel 300 that is open, is oxidized with the anode, and is then discharged through the fuel gas outlet manifold 1.

FIG. 9 is a cross-sectional view of a gas leakage prevention manifold 6 according to the present invention. As shown in FIG. 9, in the gas leakage prevention manifold 6 (section F-F), the cathode channel 100, fuel gas reforming channel 200 and anode channel 300 are closed to prevent the flow of gas.

As described above, the separator for a molten carbonate fuel cell according to the present invention is advantageous in that fuel gas, introduced into a fuel gas reforming channel through an anode channel, is reformed in a fuel gas reforming channel and is then discharged to an anode, and oxidant gas, introduced into a cathode channel, is reacted with a cathode and is then discharged, so that the volume of the fuel cell can be decreased even though a fuel gas reforming apparatus provided outside the fuel cell is not used, and the structure thereof is simple, thus reducing the production cost thereof.

Further, according to the separator for a molten carbonate fuel cell of the present invention, when a fuel gas reforming channel is formed in the separator for a molten carbonate fuel cell, the temperature of the stack of the fuel cell is maintained uniform, and thus the stack can be maintained in a stable state. That is, in the fuel cell, an oxidation reaction, which is an exothermic reaction, is conducted at an anode, and simultaneously, a reduction reaction, which is an endothermic reaction, is conducted at a cathode. In this case, since the amount of heat generated by electrochemical reactions is much greater than the amount of removing heat from stack by the convection, the temperature of the stack is high and nonuniform, and thus the stack is in an unstable state. However, when the fuel gas reforming channel is formed in the separator, since some of the heat of the stack can be used as heat of a fuel gas reforming reaction, which is an endothermic reaction, an excessive increase in the temperature of the stack is prevented, so that the lifespan of the fuel cell can be increased and the performance thereof can be improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A separator for a molten carbonate fuel cell, the separator including four steel sheets in which edges of the four steel sheets are joined to each other thereby providing three spaces therebetween, comprising:
    a cathode channel formed between two of the four steel sheets, serving as a flow path of oxidant gas to be reduced with a cathode in the cathode channel, and formed in a first space;
    an anode channel formed between two of the four steel sheets, serving as a flow path of fuel gas, and formed in a second space such that the anode channel is separated from the cathode channel;
    a fuel gas reforming channel formed between two of the four steel sheets, and formed in a third space located between the first space and the second space;
    an oxidant gas inlet manifold for introducing the oxidant gas into the cathode channel;
    an oxidant gas outlet manifold for discharging the oxidant gas from the cathode channel;
    a fuel gas inlet manifold for introducing the fuel gas into the fuel gas reforming channel;
    a fuel gas outlet manifold for discharging the fuel gas from the anode channel; and
    a reformed gas exchange manifold for carrying the fuel gas from the fuel gas reforming channel to the anode channel
    wherein
    the oxidant gas inlet manifold, the oxidant gas outlet manifold, the fuel gas inlet manifold, the fuel gas outlet manifold and the reformed gas exchange manifold are formed in a border of the separator, and
    the oxidant gas inlet manifold and the fuel gas outlet manifold are formed on one side of the border and disposed horizontally separated from each other so as not to vertically correspond to each other at the one side of the border.

2. The separator for a molten carbonate fuel cell according to claim 1, wherein the reformed gas exchange manifold and the oxidant gas outlet manifold are located on another side of the border,
    wherein the fuel gas is introduced into the fuel gas reforming channel through the fuel gas inlet manifold, moves to a reformed gas exchange manifold by coming together, turns back to the anode channel, and then discharges through the fuel gas outlet manifold; and
    wherein the fuel gas reforming channel and the anode channel diverge from the reformed gas exchange manifold.

3. The separator for a molten carbonate fuel cell according to claim 2, wherein
    the oxidant gas is introduced into the oxidant gas inlet manifold, reduced with the cathode, and then discharged through the oxidant gas outlet manifold, and
    wherein the oxidant gas inlet manifold and the oxidant gas outlet manifold are located on diagonally opposite sides of the separator so that the oxidant gas generally diagonally flows in the cathode channel.

4. The separator for a molten carbonate fuel cell according to claim 2, wherein
    the fuel gas inlet manifold is located on the one side of the border on which the fuel gas outlet manifold and the oxidant gas inlet manifold are located.

5. The separator for a molten carbonate fuel cell according to claim 4, wherein the reformed gas exchange manifold is located horizontally between the fuel gas outlet manifold and the oxidant gas inlet manifold so as not to vertically correspond to the fuel gas outlet manifold and the oxidant gas inlet manifold.

6. The separator for a molten carbonate fuel cell according to claim 5, wherein the oxidant gas inlet manifold and the oxidant gas outlet manifold are located on diagonally opposite sides of the separator so that the oxidant gas generally diagonally flows in the cathode channel.

7. The separator for a molten carbonate fuel cell according to claim 1, wherein the fuel gas reforming channel is provided with a catalyst layer for reforming fuel gas.

8. The separator for a molten carbonate fuel cell according to claim 1, further comprising:
    a gas leakage prevention manifold in which the cathode channel, the fuel gas reforming channel and the anode channel are closed, the gas leakage prevention manifold is formed in the border of the separator.

9. The separator for a molten carbonate fuel cell according to claim 8, wherein the gas leakage prevention manifold is located on another side of the border on which the reformed gas exchange manifold is located.

* * * * *